United States Patent Office 2,886,415
Patented May 12, 1959

2,886,415

YIELD SEED AND METHOD FOR PREPARING SAME

Leif Aagaard, Plainfield, N.J., assignor to National Lead Company, New York, N.Y., a corporation of New Jersey No Drawing. Application November 12, 1953
Serial No. 391,771

10 Claims. (Cl. 23—202)

The present invention relates in general to the preparation of a titanium oxide pigment material and more particularly to an improved yield seed and method for making the same for hydrolyzing titanium sulfate solutions.

In general, a hydrated titanium sulfate precipitate is prepared by digesting titaniferous iron ores with sulfuric acid to form a digestion cake which is dissolved in water and the solution reduced to convert the ferric iron values to ferrous iron. The solution is then clarified and crystallized by chilling to remove part of the ferrous iron as ferrous sulfate. Generally thereafter the crystallized solution is concentrated and then hydrolyzed under carefully controlled conditions to precipitate out a titanium oxide hydrolysate.

The complex, time-consuming and exacting nature of the foregoing process has been a constant challenge to manufacturers for the development of simplified procedures, better yields, consistent results and similar improvements. Typical of these earlier efforts are those disclosed in U.S. Patent No. 2,516,604, Tanner, Jr., July 25, 1950, for a "Method of Preparing Nucleating Agent and Use of Same in Hydrolyzing Titanium Salt Solutions in Production of Titanium Oxide Production;" and U.S. Patent No. 2,503,692, Tanner, Jr., April 11, 1950, for "Preparation of Titanium Dioxide Pigments." Both of these patents relate to processes for preparing hydrous titanium oxide by boiling a sulfate solution with a nucleating agent to produce a readily calcined hydrolysate. However, these methods, like earlier methods for preparing hydrous titanium oxide, are relatively complex, expensive, require relatively large percentages of nuclei to effect high recoveries and, due to the use of high temperature reactions and acid treatments, are characterized by industrial hazards.

An object of the present invention is to provide a superior process for accelerating the hydrolysis of titanium salt solutions.

Another object of the invention is to provide a highly potent yield seed for hydrolyzing titanium salt solutions.

A further object of the invention is to provide a superior method for preparing an improved yield seed economically, safely and in relatively few operations.

A further object of the invention is to provide a superior method for preparing a highly potent yield seed wherein low temperature reactions are employed.

An additional object of the invention is to provide a superior yield seed having usually high potency such that relatively small amounts may be used to effect high recoveries from uncrystallized, unconcentrated titanium salt solutions; and wherein small amounts of the yield seed will hydrolyze titanium salt solutions in a relatively short time.

These and other objects of the invention will become apparent from the following description.

In its broadest aspects, the present invention relates to the discovery of and method for making an alkali altered titania hydrate prepared by reacting metatitanic acid, as for example an aqueous slurry of a titania hydrate, with an alkali metal hydroxide, such as sodium hydroxide, at a predetermined temperature and for a specific length of time.

In particular, the alkali altered titania hydrate of this invention is a highly potent yield seed which, when dispersed in concentrated sulfuric acid, as hereinafter described, will form as high as about 80% colloidal titania; and which, when calcined, will have, by X-ray analysis, a system comprising the $Na_2O:5TiO_2$ component alone or in combination with lesser amounts of the $Na_2O:3TiO_2$ component, the process for making the yield seed being characterized by adherence to a prescribed alkali content in an admixture produced by mixing together the alkali and hydrous titania and curing the admixture within a temperature range prescribed by the alkali content of the yield seed.

There are several ways in which the metatitanic acid may be altered by the alkali. For example, dry pellets of sodium hydroxide may be added to the titania hydrate slurry, an aqueous solution of sodium hydroxide of 50% alkali content may be run into the titania hydrate slurry, or the latter may be run into the sodium hydroxide solution. The latter procedure is preferably over the former due to the fact that when the titania hydrate slurry is added to the aqueous sodium hydroxide solution, the concentration of the latter is initially at its maximum value and consequently effects a substantially completed alteration of the titania hydrate being added. On the other hand, by adding the aqueous sodium hydroxide solution to the titania hydrate, the alkali content of the admixture is initially very low and only builds up very slowly so that alteration of the titania hydrate is less complete.

Of primary importance to the production of an alkali altered titania hydrate having the novel features which characterize the yield seed of this invention is the discovery that the potency of a yield seed formed from an admixture of alkali and titania hydrate is a function not only of the ratio of alkali to hydrous titania used in preparing the mixture, but also of the alkali content of the mixture at curing. As used herein, the phrase "alkali content at curing" shall be understood to mean the amount of alkali actually present during curing to form the alkali altered hydrate.

Whereas, prior to applicant's discovery, it was thought that the ratio of alkali to titania hydrate used in preparing the mixture was sufficient to define the requisites of the seed, it has remained for applicant to discover that the amount of alkali actually present during curing is a controlling factor in the production of a highly potent yield seed and is not necessarily synonymous with the ratio of alkali to hydrous titania initially used in preparing the mixture.

The present invention relates to the discovery that in preparing a mixture of alkali and hydrous titania in a given ratio, both the alkali content of the mixture at curing and the curing temperature must be within predetermined ranges in order to achieve a highly potent yield seed; and that when both the ratio of alkali to hydrous titania in the mixture and the alkali content at curing are low, and the mixture is cured at low temperatures, the resulting yield seed is undercured and hence will be of low potency whereas if higher curing temperatures are used, a yield seed of higher potency is formed. Moreover, when the ratio of alkali to hydrous titania in the mixture is high but the alkali content at curing is low and low curing temperatures are used, the yield seed will be of poor potency whereas by increasing the alkali content at curing and curing at a temperature prescribed by the higher alkali content, a highly potent yield seed will be formed. And further, when both the ratio of alkali to hydrous titania and the alkali content at curing are high and relatively high curing temperatures are employed, the resulting seed will be overcured and hence of poor potency.

In brief, it is evident that relatively high temperatures must be used in curing mixtures of hydrous titania and alkali wherein the alkali content at curing is low; and that low curing temperatures must be used when the alkali content at curing is high. Thus, it may be said that the curing temperatures used are in the inverse order of the alkali content of the admixture at curing.

As pointed out above, there are several methods by which the alkali altered hydrate may be formed, but preferably a substantially pure titania hydrate is added to water to produce a slurry which is then added to an alkali solution of NaOH of substantially 50% alkali content. The mixture, which in this instance may be referred to as an aqueous slurry, is stirred constantly and simultaneously heated, the temperature employed being dependent upon the alkali content of the mixture at curing.

After the aqueous slurry has been heated for a period of time sufficient to alter the hydrate, the latter is recovered from the filtrate and subsequently washed to remove any excess alkali. Where the alkali altered hydrate is to be stored for any appreciable length of time, it may be preserved as a slurry or dried to form a cake. If, on the other hand, the alkali altered hydrate is to be used immediately in the hydrolysis of titanium sulfate solutions, then the hydrate may be washed and added directly to a sulfate solution.

Turning now to a consideration of the quantitative relationships which exist between these factors in the production of a yield seed of high potency: In an admixture of alkali and hydrous titania formed by mixing an aqueous solution of sodium hydroxide of 50% alkali content with an aqueous slurry of hydrous titania wherein the ratio of alkali to hydrous titania is relatively low, as for example in the range of from 0.5:1 to 1:1 and the alkali content, as NaOH, at curing is in the range of from about 20% to about 23% on a $TiO_2$ basis, then the curing temperatures required for effective alteration of the mixture for producing a highly potent yield seed are in the range of from about 85° to 100° C., the preferred curing temperature being about 90° C. At curing temperatures below about 85° C. the seed is incompletely cured and its potency impaired.

For a mixture formed from a somewhat higher ratio of alkali to $TiO_2$, as for example from 1:1 up to 3:1, an alkali content at curing is from 23% to as high as 25% on a $TiO_2$ basis, the curing temperature range is from about 60° C. to a maximum of 80° C. At temperatures above 80° C. the alteration of the hydrate, as determined by its colloidal content when tested in the manner hereinafter described, decreases sharply such that at a curing temperature as high as boiling, the potency of the yield seed is exceptionally low.

For a mixture formed with a ratio of alkali to hydrate at from 3:1 to 5:1 and an alkali content at curing as high as from 25% to 35%, on a $TiO_2$ basis, even lower curing temperatures must be used to produce a highly potent yield seed. For example, when the alkali content at curing is about 30%, the curing temperature range will be between 50° C. and a maximum value of about 75° C. beyond which the effective alteration of the hydrate decreases sharply such that at curing temperatures as high as 85° the seed is overcured, and hence the potency of the yield seed is lowered.

The same trend prevails as the alkali content of the mixture increases so that for a mixture wherein the ratio of alkali to hydrate is in the range of from 5:1 to 10:1 and the alkali content at curing is as high as from 36% to 41%, the optimum curing temperatures are as low as from 30° C. to 40° C. within which temperature range the hydrate is effectively altered to produce a highly potent yield seed. On the other hand, if curing temperatures appreciably higher than 35° C. are used, the seed is overcured and its potency destroyed.

To hydrolyze a titanium salt solution with a yield seed formed by the process of this invention, a sulfate solution of from 140–240 g.p.l. $TiO_2$ may be employed to which the yield seed is added in an amount in a range of from 0.5% to 1.5% and preferably about 1% based on the amount of $TiO_2$ in the sulfate solution. The mixture is boiled for a period of from 1 to 3 hours until the titanium values are precipitated out as a titania hydrate. As pointed out above, the recoveries of titania hydrate from sulfate solutions by use of the superior yield seed of this invention are unusually high being in the range of from 96 to 98%.

Reference hereinabove to the potency of the yield seed shall be understood to be indicative of the amount of titania hydrate precipitated from a titanium salt solution by hydrolysis in the presence of the improved yield seed of this invention, a highly potent yield seed being defined arbitrarily as one which when added in an amount of 1%, as $TiO_2$, to a titanium sulfate solution of 200 g.p.l. will provide yields, on hydrolysis, of from 96 to 98% titania hydrate in about two hours.

The high yield potential of the improved yield seed of this invention is an outstanding feature of this seed and one which is characterized by the amount of titania hydrate which will be converted to colloidal form in a sulfuric acid dispersion of the yield seed. A test for this characteristic of the yield seed is caried out by adding concentrated sulfuric acid (96%) to the yield seed in the weight ratio of acid to $TiO_2$ of about 1.225 in excess of the stoichiometric amount for complete neutralization of the alkali to form a colloidal dispersion, the temperature of the reaction being kept at less than 50° C. by means of a cold water bath. Having determined the amount of $TiO_2$ in the colloidal dispersion, the dispersion is then flocculated by adding an excess of hydrochloric acid thereto in the ratio of one part concentrated acid to one part water, and the flocculant removed by filtration. The filtrate is then analyzed for the residual titanium values which are present in crystalloidal form. The difference between the total amount of $TiO_2$ in the dispersion and the crystalloidal titanium values of the filtrate equals the amount of colloidal titanium. A highly potent yield seed is one wherein, by the foregoing test, 80% of the titanium values are found to be in colloidal form.

The test serves to show that when a yield seed of low alkali content is heated at temperatures below those prescribed by the instant invention, it is insufficiently cured and does not disperse fully in sulfuric acid, which is indicative of a poor yield seed, whereas when the temperature ranges prescribed by the instant invention are used, the percent colloids is relatively high, indicating a highly potent yield seed; and similarly, when a yield seed of high alkali content is cured at temperatures above the range prescribed by the instant invention, the dispersion of the seed in sulfuric acid is actually a crystalloidal solution, i.e. contains substantially no colloids, and hence is indicative of an ineffective yield seed whereas by curing a high alkali content seed within the temperature range defined by the invention, a dispersion of high colloidal content is formed, thus indicating a highly potent yield seed.

Expressed in other words, the temperatures used for curing the hydrate in the presence of an alkali are sufficiently high to modify the hydrate such that it will form a colloidal dispersion in sulfuric acid; and yet not so high as to convert the hydrate to a titanate for in this event a sulfuric acid solution of the modified hydrate is crystalloidal and no longer colloidal.

The alkali altered hydrous titanium oxide of this invention is further characterized after calcination by a system which comprises one or at most two components, as determined by X-ray analysis. Specifically, the two components of the system are determined by X-ray defraction patterns of calcined samples of the yield seed which are washed prior to calcination to remove excess alkali, the calcinations being carried out at a temperature of about 950° C. for 2 hours. In some cases the calcined product showed the presence of both the $Na_2O:3TiO_2$ and the $Na_2O:5TiO_2$ components, the titanium dioxide content of the former component being 79.5% and the titanium dioxide content of the latter component being 86.6%. Moreover, not only are these two components of high titanium dioxide content present in the yield seed but invariably the amount of the latter component, namely $Na_2O:5TiO_2$, was found to greatly exceed the former and in many instances this component alone comprised the entire system which accounts, in part, for the superior potency of the yield seed of this invention.

As pointed out above, among the more outstanding advantages of the alkali altered titania hydrate, or yield seed, of this invention is that hydrolysis of titanium salt solutions may be carried out at a relatively rapid rate, thereby effecting a substantial saving in the cost of manufacture of the hydrate. Moreover, the amount of yield seed, as $TiO_2$, required at hydrolysis to produce recoveries of from 96 to 99% titania hydrate from salt solutions are unusually small, being in the range of from 0.5% to 1% based on the amount of $TiO_2$ in the solution to be hydrolyzed.

An even more unusual characteristic of the yield seed is the success which accompanies its use with titanium sulfate solutions of relatively low titania concentrations such as occur both in uncrystallized sulfate solutions and in uncrystallized unconcentrated solutions. When added to such solutions wherein the titania concentration is as low as 140–150 grams per liter, the rate of hydrolysis is actually increased over the rate of hydrolysis of a normal crystallized and concentrated solution, the time of hydrolysis being as low as ⅓ the time required for a standard Blumenfeld process.

Moreover, since the yield seed of this invention is highly potent, the addition of the yield seed to a sulfate solution effects substantially no dilution of the solution, and consequently greater throughputs of a hydrate are assured. It is clear, therefore, that the necessity for maintaining expensive vacuum evaporation treatment for increasing the concentration of titania values in the sulfate solutions for hydrolysis may be dispensed with, thereby effecting a substantial saving in the cost of hydrolyzing sulfate solutions.

In order that the invention may be more readily understood, the following specific examples are given.

EXAMPLE I

To 50 grams of sodium hydroxide as a 50% aqueous solution was added substantially 333 grams of an aqueous slurry of pure hydrated titania of substantially 30% solids content obtained by hydrolytic precipitation from a titanium sulfate solution, the ratio of sodium hydroxide to the titania hydrate on a $TiO_2$ basis being about 0.5. The total weight of the mixture was about 433 grams of which about 42 grams was unreacted NaOH, the remaining 8 grams of NaOH being neutralized by the sulfuric acid in the titania hydrate. Initially, therefore, the NaOH content of the mixture was about 9.9%. The mixture was then heated for a period of time sufficient to remove substantially all of the uncombined water and increase the NaOH content of the mixture at curing to about 22%. Curing was carried out by heating the mixture at a temperature of about 90° C. for about 1 hour to produce a substantially dry yield seed. This alkali altered hydrate was tested for dispersibility and colloidability by adding 454 grams of the alkali altered hydrate to concentrated sulfuric acid in the weight ratio (sulfuric acid to $TiO_2$) of 1.225 in excess of the stoichiometric amount for complete neutralization of the alkali. The temperature of the mixture was kept below about 50° C. by a cold water bath. The alkali altered hydrate was readily dispersed in the sulfuric acid. The sulfuric acid dispersion was analyzed and found to contain 30% colloidal titania of the total titania hydrate present.

A sample of the alkali altered hydrate washed free of excess alkali and sulfates analyzed as comprising about 85% $TiO_2$; and when calcined at a temperature of about 950° C. for about 2 hours had an X-ray diffraction pattern which disclosed a two component system comprising $Na_2O:5TiO_2$ and $Na_2O:3TiO_2$ in substantially the ratio of 3 to 1.

To 1000 milliliters of a concentrated, crystallized titanium liquor containing 260 grams $TiO_2$ was added at 60° C. about 17 grams, on a $TiO_2$ basis, i.e. about 1% of the above described yield seed, in the form of a slurry of 18% solids content. The mixture was adjusted with water to 200 g.p.l. $TiO_2$ and then heated initially to a temperature of 110° C. and boiled for 2 hours. Upon completion of the treatment the yield of hydrous titania oxide was 95%.

The precipitated hydrous titania was then processed to rutile pigment using about 3% rutile promoter at bleach and calcining with a 0.3% potassium hydroxide and 0.14% $Al_2O_3$. Post calcination treatment after wet milling was with 1% $Al_2O_3$. The calcined product was chaser milled and micronized according to standard procedures and found to have a tinting strength of about 1600 (Reynolds number).

EXAMPLE II

A second yield seed was made employing the procedure described in Example I except in this instance the ratio of caustic to titania hydrate, on a $TiO_2$ basis, in the admixture of sodium hydroxide and hydrate was about 1.0, the sodium hydroxide content of the mixture before heating being about 17.3%. The mixture was heated initially for a sufficient length of time to remove an appreciable amount of uncombined water at which time the product had a NaOH content at curing of about 23%. This product was then cured by heating for about 1 hour at a temperature of about 80° C. to produce the final yield seed.

When tested for dispersibility and colloidability, this yield seed dispersed readily in sulfuric acid, the dispersion being found to contain 25% colloidal titania.

X-ray diffraction patterns of the washed and calcined seed disclosed a two component system comprising $Na_2O:5TiO_2$ and $Na_2O:3TiO_2$ in the ratio of 12 to 1.

About 1% of this yield seed in the form of a slurry of about 18% solids content was added at hydrolysis to a titanium sulfate solution containing 200 g.p.l. $TiO_2$, and after heating at 110° C. for 2 hours gave a hydrous $TiO_2$ recovery of about 96%.

The precipitated titania hydrate was then processed to rutile pigment, in the manner described in Example I above and had a tinting strength of about 1650.

Four additional yield seeds were made, each employing the procedures described in Example I except that in these cases the ratios of caustic to titania, on a $TiO_2$ basis, in the admixture of sodium hydroxide and hydrate were 2, 5, 6 and 10, the alkali contents of the mixtures at curing being 23%, 34%, 36% and 41% respectively. At these higher ratios of alkali to $TiO_2$ there was substantially no free or uncombined water and consequently no initial heating period was required. The following table tabulates the important characteristics of these yield seeds produced by the process of this invention having the percent caustic contents listed above.

Table I

| Example | Ratio, NaOH/TiO₂ | Alkali Content at Curing, percent | Curing Temp. at 1 hr. | Percent TiO₂ in Washed Titanate | Percent Colloidal TiO₂ (Test) | Percent Yield TiO₂ (1% at hyd.) | Tinting Strength (Calcined Pigment) |
|---|---|---|---|---|---|---|---|
| 3 | 2 | 23 | 70 | 87.9 | 30 | 96 | 1,650 |
| 4 | 5 | 34 | 50 | 88.2 | | 96 | 1,600 |
| 5 | 6 | 36 | 40 | 88.6 | | 96 | 1,600 |
| 6 | 10 | 41 | 35 | 87.5 | | 97 | 1,650 |

Although the yield seed of this invention may be used in the form of a dry powder or an aqueous slurry, it is also within the purview of the invention to use the seed in the form of a colloidal dispersion in an acid medium.

Thus, for example, to an alkali altered hydrate prepared in accordance with the process of this invention is added concentrated sulfuric acid (96%) in the weight ratio of acid to TiO₂ of about 1.23 in excess of the stoichiometric amount for complete neutralization of the alkali, the temperature of the reaction being kept in the range of from 40–50° C.

A typical sol prepared in this manner from an alkali altered hydrate cured at a temperature of about 70° C. was tested as a yield seed by adding 1% of the sol to a sulfate solution of 200 g.p.l. TiO₂. After boiling for 2 hours the TiO₂ recovery was 96%.

Further investigation has shown that heat treatment of the sols prepared from alkali altered hydrates of this invention increased the potency of the sol. Thus, when the sol prepared in the manner set forth above was heat treated for 1 hour at 60° C. and added to a sulfate solution of 200 g.p.l. at hydrolysis, the recovery of TiO₂ was increased to 97%.

From the foregoing description and examples, it is clear that the success of the instant invention is based on the discovery that in the preparation of a yield seed from an admixture of an alkali and titania hydrate, the potency of the yield seed, in terms of the amount of titania hydrate precipitated at hydrolysis by the addition of about 1% of the yield seed (on a TiO₂ basis) to a sulfate solution, is determined not alone by the ratio of caustic to titania hydrate but also by the alkali content of the admixture, i.e. the amount of alkali actually present in the alkali altered hydrate; and that the curing temperature bears a direct relationship to the alkali content of the admixture such that when the curing temperatures used are within the range prescribed by the alkali content of the admixture, the yield seed will have its maximum potency, whereas when the curing temperatures used are above the temperature limits prescribed by the alkali content of the admixture, the yield seed will be overcured and hence rendered relatively impotent.

While this invention has been described and illustrated by the examples shown, it is not intended to be strictly limited thereto, and other variations and modifications may be employed within the scope of the following claims.

I claim:

1. A process for producing a yield seed for hydrolyzing titanium sulfate solutions comprising the steps of: mixing an alkali metal hydroxide and metatitanic acid in ratios of alkali to acid within the range of from 0.5:1 to 1:1; providing in said mixture an alkali content at curing within the range of from 23 to 25% on a weight basis, the percent alkali being increased with an increase in the ratio of alkali to acid and curing said mixture by heating said mixture at a temperature within the range of from 60 to 70° C. for about 1 to 2 hours, the temperature employed being in the inverse order of alkali content.

2. A process for producing a yield seed for hydrolyzing titanium sulfate solutions comprising the steps of: mixing an alkali metal hydroxide and metatitanic acid of from 18 to 30% solids in ratios of alkali to acid within the range of from 1:1 to 3:1; providing in said mixture an alkali content at curing within the range of from 25 to 35% on a weight basis, the percent alkali being increased with an increase in the ratio of alkali to acid and curing said mixture by heating said mixture at a temperature within the range of from 50 to 75° C. for from about 1 to 2 hours, the temperature employed being in the inverse order of alkali content.

3. A process for producing a yield seed for hydrolyzing titanium sulfate solutions comprising the steps of: mixing an alkali metal hydroxide and metatitanic acid of about 23% solids in amounts sufficient to achieve an effective alkali content at curing of said mixture within the range of from 35 to 40% on a weight basis, and curing said mixture by heating said mixture at a temperature within the range of from 30 to 40° C. for from about 1 to 2 hours, the temperature employed being in the inverse order of alkali content.

4. A yield seed produced by the process of claim 1 and characterized by a colloidal titanium dioxide content in the range of from 20 to 40% when dispersed and flocculated in an aqueous solution of sulfuric acid, and an X-ray defraction pattern exhibiting a system comprising Na₂O:5TiO₂ when washed and calcined at a temperature of about 1000° C. for about two hours.

5. In a process for preparing hydrous titanium dioxide, the step which comprises hydrolyzing a titanium sulfate solution in the range of from about 140 to about 240 g.p.l. solids content in the presence of a yield seed in an amount of from 0.5 to 1.5% based on the TiO₂, said yield seed having been prepared by heating a mixture of metatitanic acid of from 18 to 30% solids content and an alkali metal hydroxide in ratios of alkali to acid within the range of from 0.5:1 to 10:1 for from 1 to 2 hours wherein the content of alkali metal hydroxide in the mixture at curing varies directly from 23 to 40% on a weight basis, the temperatures employed for curing the mixture being in the range of from 30 to 80° C. and in the inverse order of alkali content.

6. In a process for preparing hydrous titanium dioxide the step which comprises hydrolyzing a titanium sulfate solution in the range of from about 140 to about 240 g.p.l. solids content in the presence of a washed yield seed in an amount of about 1% based on the TiO₂, said washed yield seed having been prepared by heating a mixture of metatitanic acid of about 23% solids with a 50% solution of alkali metal hydroxide in the ratio of alkali to acid within the range of from 0.5:1 to 1:1 for from 1 to 2 hours wherein the content of alkali metal hydroxide at curing varies directly from 23 to 25% on a weight basis, the temperatures employed for curing the mixture being in the range of from 60 to 80° C. and in the inverse order of alkali content.

7. In a process for preparing hydrous titanium dioxide the step which comprises hydrolyzing a titanium sulfate solution in the range of from about 140 to about 240 g.p.l. solids content in the presence of a washed yield seed in an amount of about 1% based on the TiO₂, said washed yield seed having been prepared by heating a mixture of metatitanic acid of about 23% with a 50% solution of an alkali metal hydroxide in the ratio of alkali to acid within the range of from 1:1 to 3:1 for from 1 to 2 hours wherein the content of alkali metal hydroxide at curing varies directly from 25 to 35% on a weight basis the curing temperatures employed for curing the mixture being in the range of from 50 to 75° C. and in the inverse order of alkali content.

8. In a process for preparing hydrous titanium dioxide the step which comprises hydrolyzing a titanium sulfate solution in the range of from about 140 to about 240 g.p.l. solids content in the presence of a washed yield seed in an amount of about 1% based on the TiO$_2$, said washed yield seed having been prepared by heating a mixture of metatitanic acid of about 23% solids with a 50% solution of an alkali metal hydroxide for from 1 to 2 hours wherein the content of alkali metal hydroxide in said mixture is from 36 to 40% and the curing temperature is in the range of from 30° C. to 40° C.

9. A process for producing a sol comprising the steps of preparing a yield seed in accordance with claim 1, and then adding sulfuric acid to said yield seed in the weight ratio of acid to TiO$_2$ of about 1.23.

10. A process for producing a sol comprising the steps of preparing a yield seed in accordance with claim 1, and then adding sulfuric acid to said yield seed in the weight ratio of acid to TiO$_2$ of about 1.23; and heating the sol for a period of about 1 hour at a temperature within the range of from 60 to 70° C.

References Cited in the file of this patent

UNITED STATES PATENTS

| | | |
|---|---|---|
| 1,697,929 | Ryan | Jan. 8, 1929 |
| 2,111,460 | Rockstroh | Mar. 15, 1938 |
| 2,488,755 | Aagaard | Nov. 22, 1949 |
| 2,494,492 | Ross et al. | Jan. 10, 1950 |

OTHER REFERENCES

"Titanium," by Jekks Barksdale, 1949 ed., page 98. The Ronald Press Co., New York.